May 28, 1946.　　　J. G. INGRES　　　2,401,248
AIRPLANE PICK-UP MECHANISM
Filed April 12, 1943　　2 Sheets-Sheet 1
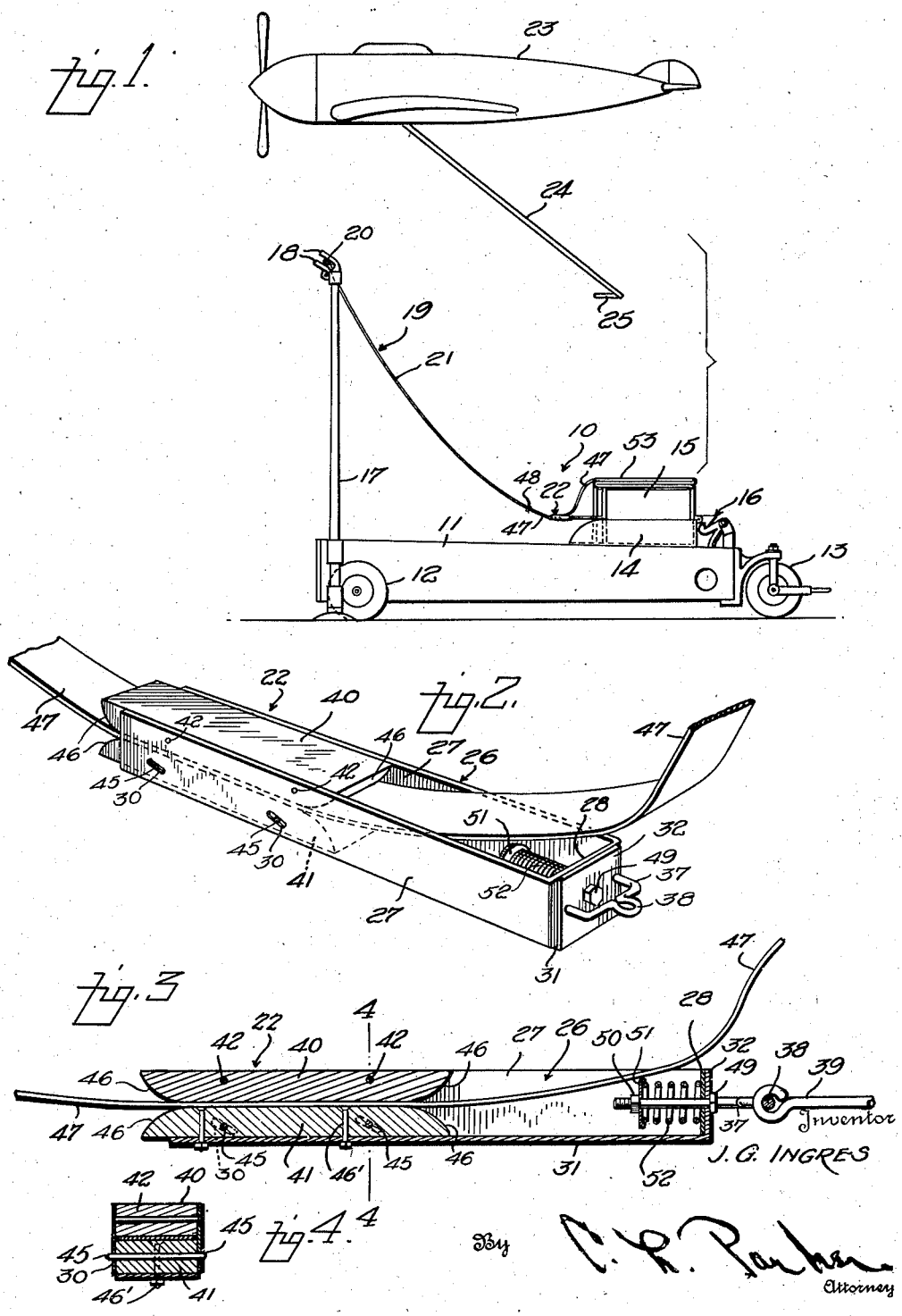

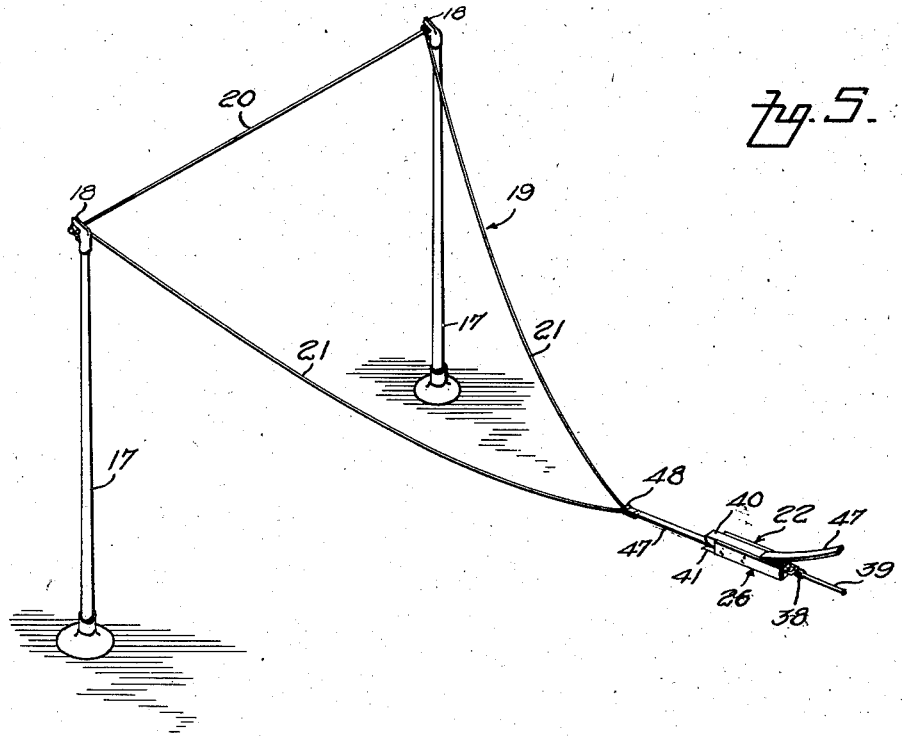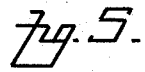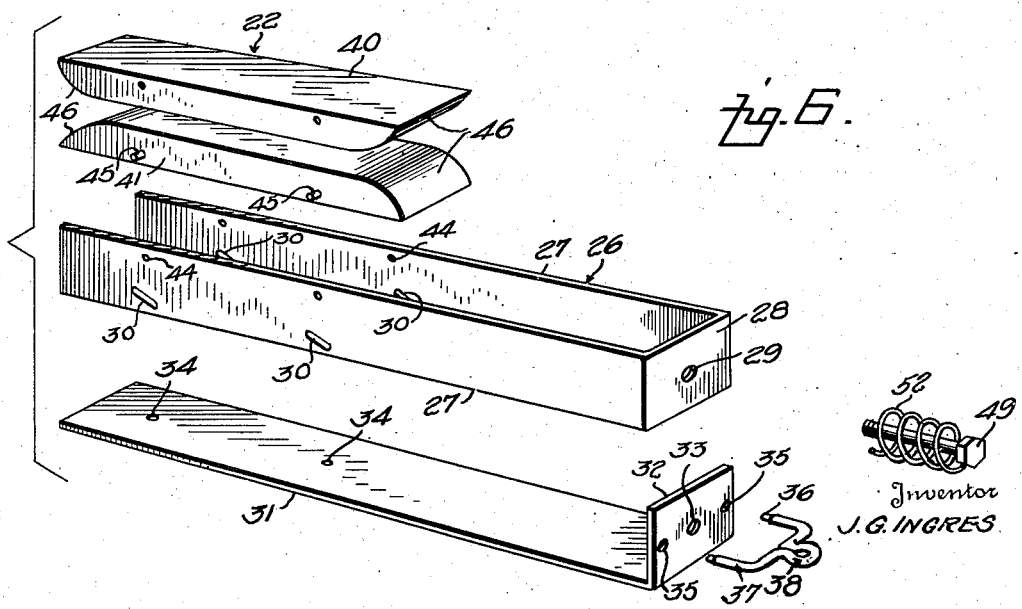

Patented May 28, 1946

2,401,248

UNITED STATES PATENT OFFICE 2,401,248

AIRPLANE PICKUP MECHANISM

Jeannot G. Ingres, Detroit, Mich., assignor to G. Tucker Smith and E. Govan Hill, both of Richmond, Va., trustees Application April 12, 1943, Serial No. 482,775

4 Claims. (Cl. 258—1.6)

This invention relates to airplane pick-up mechanisms, and more particularly to such a mechanism wherein the load to be picked up is projected by a catapult.

A number of pick-up mechanisms have been developed wherein a pair of spaced masts support a flexible loop connected to an article on a catapult latched against movement and releasable when an airplane-carried hook engages the loop. Such an apparatus is designed to project the article so that it will be picked up when travelling approximately at the speed of the airplane, thus eliminating the transmission of sudden shocks to the plane, and permits an airplane to very easily pick up loads many times greater than can be readily picked up without the use of a catapult.

In prior mechanisms of this type the pick-up loop has been made of shock cord, the structural and physical characteristics of which are well known. A shock cord is highly elastic and is used in the making of the loop so that any variations in the speed of the plane and of the catapulted load will be compensated for, particularly when the load is imposed on the plane while travelling slightly slower than the plane. Such a mechanism is highly satisfactory but becomes increasingly disadvantageous as the loads to be picked up become relatively heavy. The reason for this is that when the pick-up operation is performed with the plane travelling somewhat faster than the load, the stretching of the shock cord is obviously followed by a rebounding action whereby the shock cord tends to throw the load too far forward. This tends to cause it to over-shoot and might possibly cause the loop to become disengaged from the hook. Moreover, the overshooting of the load provides substantial slack in the loop cord and permits an appreciable interval of time during which some deceleration in the speed of movement of the article will take place. During this time interval, and with substantial slack present in the pick-up loop, gravity acts to cause a substantial drop in the load before the slack in the loop is taken up by the plane. This obviously is disadvantageous since it is difficult to prevent the load from striking the ground, and if this does not occur, it imposes a greater vertical load on the plane than would occur if no rebound should take place.

An important object of the present invention is to provide a novel pick-up mechanism whereby the necessary elongation in the distance between the pick-up loop and the load can occur if the pick-up operation takes place with the plane travelling at a greater speed than that of the catapulted article, but wherein rebounding of the load is eliminated.

A further object is to provide such an apparatus wherein the elongation of the pick-up device between the airplane-carried hook and the load takes place with uniform resistance as opposed to the progressively increasing tension which occurs when an elastic pick-up loop is progressively stretched.

A further object is to provide a novel device interposed between the load and the point at which the pick-up hook engages the loop to provide a snubbing action wherein the distance between the two points referred to will progressively increase with uniform resistance until the load is accelerated to the speed of the pick-up plane.

A further object is to provide such an apparatus wherein no rebounding of the load occurs after the latter is accelerated to the speed of the pick-up plane.

Other objects and advantages of the invention will become apparent during the course of the following description.

In the drawings I have shown one embodiment of the invention. In this showing

Figure 1 is a side elevation of a pick-up mechanism showing a pick-up plane passing thereover.

Figure 2 is an enlarged detailed perspective view of the snubbing device and associated elements, Figure 3 is a central longitudinal vertical sectional view through the same, Figure 4 is a detailed section on line 4—4 of Figure 3, Figure 5 is a perspective view of the pick-up loop showing it supported by the masts and connected to the snubbing device, and Figure 6 is an enlarged perspective view of the snubbing device showing the parts thereof separated.

Referring to Figure 1 the numeral 10 generally indicates the pick-up mechanism as a whole which may be of any desired type such, for example, as that shown in the copending application of Jeannot G. Ingres and Henry W. Hey, Serial No. 392,568, filed May 8, 1941, now Patent No. 2,356,671, dated August 22, 1944, in which the mechanism generally comprises a vehicle 11 supported by suitable wheels 12 and 13, the latter of which acts as a caster wheel to facilitate movement of the apparatus from place to place. A catapult generally indicated by the numeral 14 supports the article or load 15 to be picked up and is normally held in position by a latch mechanism indicated as a whole by the numeral 16. The catapult preferably includes tensioned means (not shown) tending to urge the catapult 14 toward the left as viewed in Figure 1 and operative for this purpose upon the releasing of the latch 16 in a manner to be described.

A pair of spaced masts 17 are positioned on opposite sides of the vehicle adjacent one end thereof as shown in Figure 1, and these masts are provided at their upper ends with fingers 18. One or both of the fingers of each mast may be pivoted and movement of the fingers toward or into engagement with each other is utilized, preferably by the closing of an electric circuit, for releasing the latch mechanism 16. An arrangement for this purpose is shown in the copending application referred to. Any suitable latch releasing means may be employed and such means forms per se no part of the present invention.

A loop indicated as a whole by the numeral 19 has a transverse portion 20 extending across the tops of the masts and arranged between the fingers 18 to separate these fingers pending the picking up of the loop in a manner to be described.

From the transverse portion 20 the end portions 21 of the loop converge downwardly as shown in Figures 1 and 5 and these end portions of the loop have mechanical connection with the load 15 through a snubbing device indicated as a whole by the numeral 22 and described in detail later.

In Figure 1 a plane 23 has been shown in flight over the apparatus. This plane is provided with a downwardly and rearwardly inclined arm 24 and at the lower end of this arm is arranged a hook 25 connected to a suitable cable (not shown) extending through the arm 24 into the plane to be wound upon a windlass (not shown) located in the plane to pull the load upwardly after it has been picked up. It will be apparent that the plane moves toward the left as viewed in Figure 1 and is flown with the hook 25 just below the level of the transverse portion 20 of the loop 19. The loop will strike against the arm 24 and slide downwardly into engagement with the hook 25, whereupon the latter will exert a pull on the loop to disconnect it from the fingers 18 of the masts. This operation releases the fingers 18 for movement toward or into engagement with each other, whereupon the latch mechanism 16 will be released to project the load. The catapult is preferably designed and adjusted so that the load will be travelling approximately at the speed of the plane when the loop 19 is straightened out after having been disconnected from the fingers 18.

It will be apparent that the foregoing operation frequently takes place under such conditions that the speed of the article or load will not quite have reached the speed of the plane when all the slack has been taken out of the loop. The device 22 is provided to function under the conditions referred to to permit a uniformly resisted elongation of the distance between the pick-up hook 25 and the load so as to prevent the transmission of shock loads to the plane and to eliminate the necessity for providing an elastic loop.

Referring to Figures 2 to 6 inclusive, the snubbing device 22 preferably comprises a substantially U-shaped steel body 26 having parallel arms 27 and connecting end 28, the member 26 being made of strap material. The end 28 is provided with an opening 29 (Figure 6) for a purpose to be described, and each arm 27 is provided with a pair of inclined cam openings 30, also for a purpose to be described. A second steel or other relatively stiff rigid member 31 extends along and parallel to the bottom edges of the arms 27 and has an up-turned end 32 provided with an opening 33 adapted to register with the opening 29. The member 31, as shown in Figure 6, is provided with openings 34 to receive fastening elements to be described.

The end member 32 may be provided with openings 35 to receive the reduced ends 36 of a looped connecting member 37, the ends 36 preferably being welded into the openings 35 after the assembly of certain parts of the apparatus to be described. The member 37 may be provided with an eye 38 for connection with a rod or the like 39. The latter element is connected in any suitable way to the article or load 15.

A pair of snubbing blocks 40 and 41 are arranged between the arms 27 of the member 26. The block 40 is permanently connected to the member 26 by pins 42 (Figures 3 and 4) extending through openings 44 (Figure 6) formed in the arms 27. The block 41 is provided with oppositely projecting pins 45 (Figures 4 and 6) and these pins operate in the cam slots 30. The ends of the adjacent faces of the blocks curve away from each other as at 46 to facilitate the passage between the blocks of a flexible strap 47 which may be made of any suitable material such as a heavy fabric. The block 40 is fixed to the member 26 as stated, while the block 41 is secured to the member 31 by bolts 46' (Figure 3) extending through the openings 34 (Figure 6).

The strap 47 normally extends from between the blocks 40 and 41 a sufficient distance merely to clear the blocks and has secured thereto a ring 48 (Figure 5) to which the rear ends of the loop ends 21 are suitably attached. It will be apparent that upon the picking up of the loop portion 20 by the airplane, the slack will be taken out of the loop and a direct pull transmitted to the strap 47. If, at this time, the article or load 15 has not been accelerated up to the speed of the plane, the strap 47 will be pulled between the blocks 40. These blocks act as snubbers and means are provided for effecting the desired resistance against the sliding of the strap between the blocks.

A bolt 49 has its head end seated against the end 32 of the member 31, the end 32 lying outwardly of and normally against the end 28 of the member 26 as shown in Figures 2 and 3. The inner end of the bolt 49 has an adjusting nut 50 threaded thereon and engaging against a spring seat 51. A relatively heavy compression spring 52 has its opposite ends engaging respectively against the seat 51 and the end 28 to oppose movement of the latter away from the end 32. The spring 52 operates in a manner to be described to determine the exact resistance offered by the blocks 40 and 41 to sliding movement of the strap 47 therebetween and this resistance is adjustable by turning the nut 50 to adjust the loading of the spring. The end of the strap 47 opposite its point of connection with the loop 19 may be made as long as necessary to permit the sliding of the strap between the snubbing blocks until the resistance offered by the latter to the movement of the strap accelerates the load until its speed equals that of the plane. The long end of the strap may be doubled back and forth over the top of the article 15 as indicated by the numeral 53 in Figure 1. Inasmuch as proper design largely reduces variations of the speed of the plane and the catapulted article, the strap usually need not be longer than four or five feet in length, a strap of somewhat greater length being preferably employed for relatively heavy loads.

The operation of the apparatus is as follows:

The article to be catapulted is connected to the loop 19 with the snubbing mechanism interposed between the article and the loop. The article may be in the form of a container having the member 39 connected thereto in any suitable manner. The strap 47 is arranged so that a short end thereof projects toward the loop for connection therewith as at 48, Figure 5, and the longer end of the strap may be disposed in any manner as by doubling it back and forth on top of the container, as in Figure 1.

The loop is connected between the fingers 18 of the masts 17 whereby the transverse portion 20 of the loop is arranged to be engaged by the airplane-carried hook 25. The carriage 14 is held in inoperative position by the latch mechanism 16, and any suitable means (not shown) such as the mechanism shown in the co-pending application of Jeannot G. Ingres and Henry W. Hey, raferred to above, may be employed for tending to move the catapult carriage 14 to the left as viewed in Figure 1. Conventional shock cords may be conveniently used as the source of power for tending to move the carriage 14 in the manner stated, upon the releasing of the latch mechanism 16. This mechanism is releasable in any suitable manner, for example by the means shown in the copending application referred to, when the hook 25 pulls the loop portion 20 loose from either pair of fingers 18 or both pairs of such fingers.

The apparatus is now ready for the pick-up operation. The pick-up plane will be flown over the device approximately centrally of the masts 17 with the hook 25 arranged below the level of the transverse loop portion 20 so as to become engaged therewith. The engagement of the loop portion 20 by the hook will result in the pulling of the loop from the fingers 18 and this operation results in the releasing of the latch mechanism 16. With the portion 20 of the loop carried by the hook 25, the shock cords or other force-generating means will effect movement of the carriage 14 and article 15 in the direction of the travel of the plane, the speed of the article being accelerated during its movement, as will be apparent.

The force provided for moving the catapult carriage is designed or adjusted in accordance with three factors, namely, the weight of the article 15, the speed of the plane, and the distance of movement of the hook 25 relative to the article before the slack in the loop 19 is taken up. The power delivered to the carriage 14 is intended as accurately as possible to accelerate the speed of the article approximately to the speed of the plane when all the slack is taken out of the loop 19, in which case there will be no sudden loads imposed on the plane.

From a practical standpoint, of course, it is impossible to exactly synchronize the speed of the article with the speed of the plane exactly at the time all slack is taken up in the loop 19. This being true, it is the common practice to make the loop 19 out of shock cord, or to provide a section of shock cord in the loop, so as to provide a substantial degree of elasticity of the loop as a whole to permit elongation thereof if the article is not being projected up to the speed of the plane when the slack in the loop is taken up. This means has been found quite satisfactory in actual practice for the pick-up of relatively light loads, but is increasingly unsatisfactory as progressively greater loads are picked up. It will be obvious that the greater the load the greater will be the elongation of any elastic means employed in the loop. This is advantageous for two reasons. In the first place the greater the elongation of the loop the greater will be the tensioning of the elastic portion thereof, thus progressively increasing the drag on the plane during elongation of the loop. In the second place the increasing of the tensioning of the loop results in rebound after maximum elongation has taken place, thus tending to throw the package ahead of the hook 25. Under such conditions there is danger that the article will strike the ground since the releasing of the horizontal pull on the loop when the rebound occurs permits the force of gravity to act more effectively on the load or the article. Even if the article does not strike the ground, force of gravity tends to exert a sudden downward force on the plane.

The present device is highly advantageous in that it permits elongation of the loop under the conditions referred to without increasing the tensioning thereof, the snubbing device providing uniform resistance throughout relative movement between the strap 47 and the blocks 40 and 41. The prevention of progressively increasing tensioning predetermines the maximum drag on the plane and this drag is maintained uniform. Moreover, the present device, as will become apparent, completely eliminates any rebound when relative sliding movement of the strap 47 between the blocks 40 and 41 ceases.

Referring to Figures 2, 3 and 6 it will be noted that the blocks 40 and 41 are respectively fixed to the members 26 and 31, and the spring 52 resists relative movement between the members 26 and 31. The member 31 is rigidly connected by the members 37 and 39 to the load and the inertia of the load tends to hold the member 31 against movement to the left as viewed in Figure 3. Only the spring 52 and the negligible inertia of the member 26 and block 40 oppose movement of the block 40 when a pull is exerted on the pick-up end of the strap 47.

Keeping the foregoing in mind, it will be apparent that after the hook 25 has engaged and picked up the loop 19, and assuming that the speed of the article 15 has not become synchronized with the speed of the plane when the slack has been completely taken out of the loop, the plane will exert a pull on the pick-up end of the strap 47. The pull on the strap will be transmitted to the adjacent faces of the blocks 40 and 41 and the block 40 will move more readily than the block 41 due to the inertia of the article 15, as stated. Thus the block 40 will move to the left in Figure 3 relative to the block and this movement takes place against the tension of the spring 52 which tends to maintain the cross member 28 in engagement with the end 32. Relative movement of the block 40 with respect to the block 41 also effects similar movement between the slots 30 and pins 45 and the latter will move relatively toward the lower ends of the slots 30 as viewed in Figure 3.

The operation referred to tends to move the block 41 away from the block 40. Actually this movement is not appreciable since an increase in the distance between the adjacent faces of the blocks 40 and 41 will take place only to the extent necessary for the pull on the strap 47 to cause the latter to slip in contact with the adjacent faces of the blocks 40 and 41. The amount of the pull necessary to effect such slipping movement can be predetermined by the loading of the spring 52 as may be desired.

The present device therefore predetermines the force necessary for slippage to occur between the strap 47 and blocks 40 and 41, and this likewise predetermines the drag transmitted to the article 15 in the form of a force tending to accelerate the speed thereof. When the speed of the article equals the speed of the plane there will be no further slippage of the parts and the blocks 40 and 41 will act as clutches engaging the strap 47 to prevent any further relative movement of the parts.

In view of the foregoing it will be apparent that the loop 19 may be made of non-elastic material, and the same is true of the strap 47. In fact, it is preferred that these elements be non-elastic so as to prevent any building up of any tensioning therein through which a rebounding of the article would be caused. When relative slippage of the parts ceases due to the synchronization of the speeds of the plane and the article 15, there will be no rebounding action and the article will follow behind the plane with the entire body of the loop following generally in alignment with the arm 24. Thus, there will be no over-throw of the article and the latter will be pulled at an angle with respect to the plane and thus will occupy a higher position relative to the ground than will occur if a rebounding action is permitted. Moreover, the horizontal air resistance against the article and the horizontal pulling force transmitted thereto will prevent the force of gravity from moving the article downwardly to impose a sudden vertical load on the plane, such as occurs when an elastic loop device is employed.

Thus, the present device completely eliminates every disadvantage of elastic loops now employed with mechanisms of this type. The device is extremely simple in construction and its dimensions are such that it is readily adapted to be pulled upwardly into the plane with the article. In this connection it will be noted that the airplane-carried portion of a mechanism of this type is commonly provided with a windlass to which is connected a cable extending through the arm 24 and connected to the hook 25 whereby the latter may be pulled upwardly into the plane.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In an airplane pick-up mechanism, a pick-up device adapted to be connected to an article to be picked up, comprising a loop adapted to be supported by spaced upstanding structures so as to be engaged by an airplane-carried hook, and a snubbing device between said loop and the article, comprising a strap connected to the loop, a pair of friction blocks engaging the faces of said strap, means positively connecting one of said blocks to the article, means resiliently opposing movement of the other block relative to the first named block, and means for guiding said blocks for relative movement away from each other against the tension of said resilient means when relative movement of the blocks takes place upon the pulling of said strap incident to the picking up of said loop by the airplane-carried hook.

2. In an airplane pick-up mechanism, a pick-up device adapted to be connected to an article to be picked up, comprising a loop adapted to be supported by spaced upstanding structures so as to be engaged by an airplane-carried hook, and a snubbing device between said loop and the article, comprising a strap connected to said loop, a pair of friction blocks engaging opposite faces of said strap, a frame rigidly connected to one of said blocks and positively connected to the article, a frame connected to the other block, means resiliently opposing longitudinal movement of the second named frame relative to the first named frame, and means for effecting relative movement of said blocks away from each other upon relative longitudinal movement of said frames upon the pulling of said strap incident to the picking up of said loop by the airplane-carried hook.

3. In an airplane pick-up mechanism, a pick-up device adapted to be connected to an article to be picked up, comprising a loop adapted to be supported by spaced upstanding structures so as to be engageable by an airplane-carried hook, and a snubbing device between said loop and the article, said snubbing device comprising connecting elements for connecting it respectively to said loop and to the article and one of said connecting elements comprising a strap, a pair of friction blocks having friction faces engaging opposite faces of said strap, one of said blocks having positive mechanical connection with the other connecting element, means resiliently opposing longitudinal movement of the other block relative to the first named block upon the exertion of a pull on said connecting elements incident to the picking up of said loop by the airplane-carried hook, and means for guiding said blocks for relative movement away from each other when said pull is sufficient to effect sliding movement of said strap between said friction faces.

4. In an airplane pick-up mechanism, in combination with a pair of masts, a loop extending across and supported by said masts, and a catapult adapted to support an article to be picked up, said catapult being of the type which is releasable upon the pulling of the loop from the masts by an airplane-carried hook, a pair of friction blocks, a frame connected to each block, connecting means fixed with respect to one of said frames, a strap extending between said friction blocks, said strap and said connecting means forming a pair of connecting elements respectively positively connected to the loop and to the article, means resiliently opposing relatively longitudinal movement of said frames when a pull is exerted on said connecting elements by the airplane-carried hook, and means constructed and arranged to effect relative movement of said blocks away from each other when said blocks move relatively longitudinally.

JEANNOT G. INGRES.